US010372273B2

(12) United States Patent
Ding et al.

(10) Patent No.: US 10,372,273 B2
(45) Date of Patent: Aug. 6, 2019

(54) SELF-CAPACITIVE TOUCH DEVICE AND CALCULATION METHOD THEREOF

(71) Applicant: ILI TECHNOLOGY CORP., Hsinchu County (TW)

(72) Inventors: Peng-Yun Ding, Hsinchu County (TW); Ping-Hwan Lee, Hsinchu County (TW)

(73) Assignee: ILI TECHNOLOGY CORP., Hsinchu County (TW)

( * ) Notice: Subject to any disclaimer, the term of this patent is extended or adjusted under 35 U.S.C. 154(b) by 169 days.

(21) Appl. No.: 14/804,421

(22) Filed: Jul. 21, 2015

(65) Prior Publication Data

US 2016/0018927 A1 Jan. 21, 2016

Related U.S. Application Data

(60) Provisional application No. 62/027,236, filed on Jul. 21, 2014.

(51) Int. Cl.
| | |
|---|---|
| *G06F 3/045* | (2006.01) |
| *G06F 3/044* | (2006.01) |
| *G06F 3/041* | (2006.01) |
| *G02F 1/1333* | (2006.01) |
| *G09G 3/36* | (2006.01) |
| *A61B 5/00* | (2006.01) |

(52) U.S. Cl.
CPC .......... *G06F 3/044* (2013.01); *G02F 1/13338* (2013.01); *G06F 3/0412* (2013.01); *G06F 3/0416* (2013.01); *G09G 3/3614* (2013.01); *G09G 3/3648* (2013.01); *G06F 2203/04105* (2013.01); *G06F 2203/04107* (2013.01); *G09G 2300/043* (2013.01); *G09G 2300/0408* (2013.01); *G09G 2310/0202* (2013.01); *G09G 2310/08* (2013.01)

(58) Field of Classification Search
CPC ...... G06F 3/044; G06F 3/0416; G06F 3/0418; G06F 2203/04101; G06F 2203/04111
USPC .................................................. 345/173–174
See application file for complete search history.

(56) References Cited

U.S. PATENT DOCUMENTS

| | | | | |
|---|---|---|---|---|
| 2012/0044095 | A1* | 2/2012 | Makovetskyy | G06F 3/044 341/33 |
| 2012/0313888 | A1* | 12/2012 | Lee | G06F 3/044 345/174 |

(Continued)

FOREIGN PATENT DOCUMENTS

| | | | | |
|---|---|---|---|---|
| CN | 102929458 | | 2/2013 | |
| CN | 102929458 A | * | 2/2013 | ............. G06F 3/044 |

(Continued)

*Primary Examiner* — Kwin Xie
(74) *Attorney, Agent, or Firm* — JCIPRNET

(57) ABSTRACT

A self-capacitive touch device includes a transparent substrate, multiple sensing electrodes and multiple trace lines. The sensing electrodes are alternately disposed on the transparent substrate, and each of the sensing units has a polygonal planar contour having M sides, where M is a positive integer equal to or greater than 4. A side of each of the sensing electrodes corresponds to sides of at least two of the remaining sensing electrodes. The trace lines are electrically connected to the sensing electrodes in a way that a part of segments of the trace lines are disposed in an active region of the self-capacitive touch device.

16 Claims, 2 Drawing Sheets

(56) References Cited

U.S. PATENT DOCUMENTS

2013/0307810 A1* 11/2013 Verweg .................. G06F 3/044
                                                                                             345/174
2014/0139637 A1* 5/2014 Mistry ................ H04N 5/2252
                                                                                              348/46
2015/0297145 A1* 10/2015 Luna .................... A61B 5/7278
                                                                                              600/301

FOREIGN PATENT DOCUMENTS

| TW | M481448 U | * | 1/2014 | ............. G06F 3/041 |
| TW | M481448 | | 7/2014 | |

* cited by examiner

SELF-CAPACITIVE TOUCH DEVICE AND CALCULATION METHOD THEREOF

This application claims the benefit of U.S. Provisional Application Ser. No. 62/027,236, filed Jul. 21, 2014, the subject matter of which is incorporated herein by reference.

BACKGROUND OF THE INVENTION

Field of the Invention

The invention relates in general to a self-capacitive touch device, and more particularly, to a self-capacitive touch device applied in a wearable device.

Description of the Related Art

In the recent years, with extensive developments and applications of consumer electronic products, the number of application products employing touch display devices that integrate touch control and display functions also continues to expand. Some examples of these application products include mobile phones, GPS navigation systems, tablet computers, personal digital assistants (PDAs), and laptop computers. Recently, manufacturers are also dedicated in developing wearable devices having a touch function. Compared to touch devices in common mobile devices, a touch device in a wearable electronic device usually has a smaller touch control region (or referred to as an active region) with an arched contour, resulting in different design layouts in sensing electrodes of these two types of touch devices. Therefore, there is a need for a solution that effectively performs a touch function within a small-range active region of a wearable device.

SUMMARY OF THE INVENTION

The invention is directed to a self-capacitive touch device and a calculation method thereof for overcoming the above drawbacks of the prior art.

According to an embodiment of the present invention, a self-capacitive touch device is provided. The self-capacitive touch device includes a transparent substrate, multiple sensing electrodes and multiple trace lines. The sensing units are alternately disposed on the transparent substrate, and each of the sensing units has a polygonal planar contour having M sides, where M is a positive integer equal to or greater than 4. A side of each of the sensing units corresponds to sides of at least two of the remaining sensing units. The trace lines are electrically connected to the sensing units, respectively, in a way that a part of segments of the trace lines are disposed in an active region of the self-capacitive to touch device.

According to another embodiment of the present invention, a calculation method for a self-capacitive touch device is provided for the abovementioned self capacitive touch device. The calculation method includes: detecting a touch point by the self-capacitive device to cover at least of the sensing unit, such that the sensing unit covered by the touch point generates a sensed capacitance; and multiplying the sensed capacitance by a weight to obtain a touch position of the touch point. The value of the weight is associated with the position of the sensing unit covered by the touch point.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
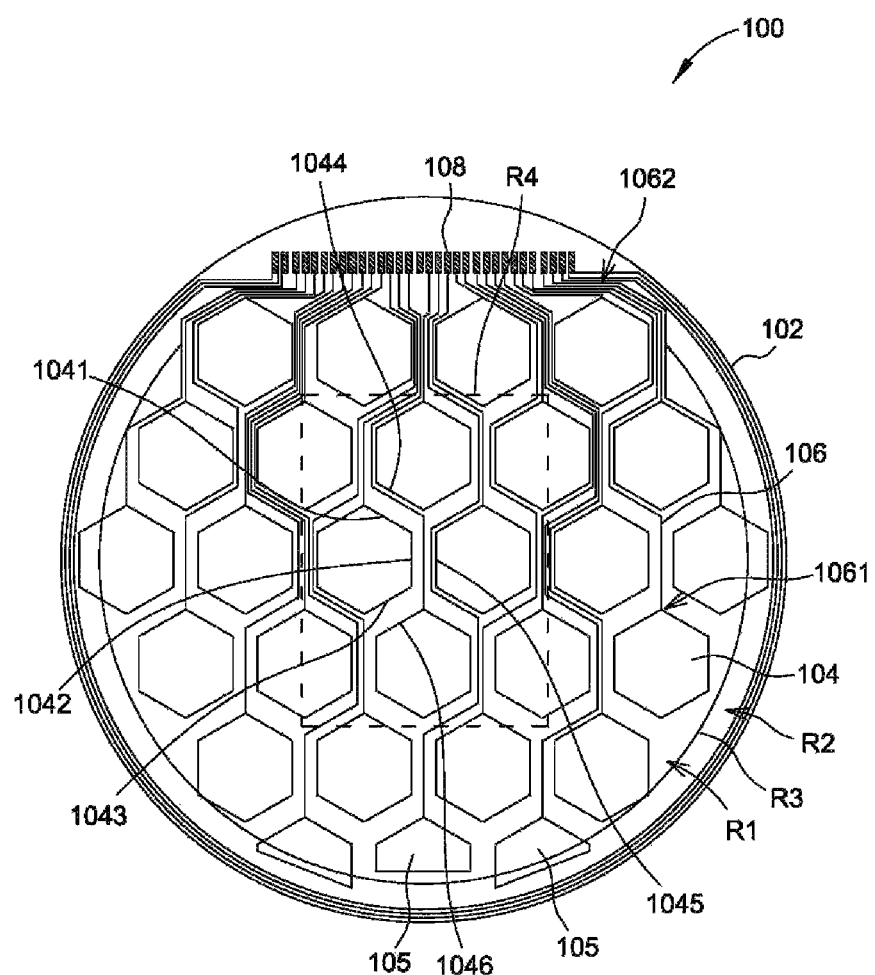
FIG. 1 is a top view of a self-capacitive touch device according to an embodiment of the present invention.

The following disclosure describes embodiments of a self-capacitive touch device and a calculation method thereof of the present invention for one person skilled in the art to accordingly implement the present invention. These embodiments are given with reference of the accompanying drawings, which also constitute a part of the implementation. Same elements in the drawings are represented by same denotations. It should be noted that, these drawings are for illustration purposes, and are not drawn to actual sizes and ratios.

Figure 2:
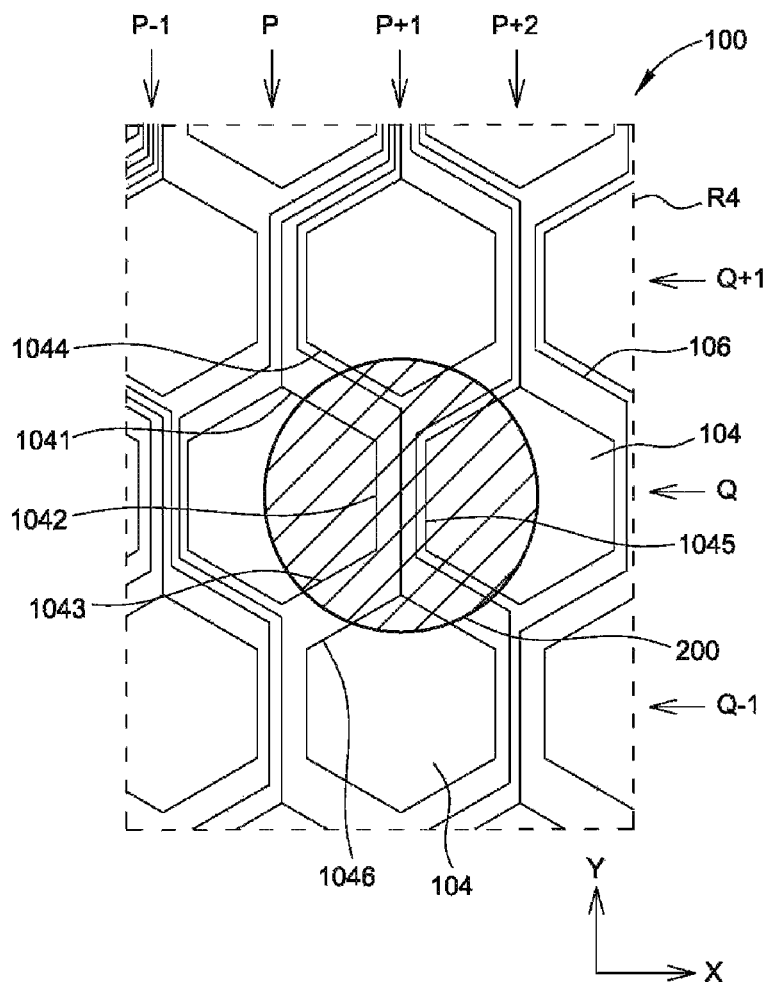
FIG. 2 is an enlarged partial view of FIG. 1.

FIG. 1 shows a top view of a self-capacitive touch device according to an embodiment of the present invention. FIG. 2 shows an enlarged partial view of FIG. 1. As shown in FIG. 1 and FIG. 2, a self-capacitive touch device 100 includes at least a transparent substrate 102, a plurality of sensing units 104, a plurality of border sensing units 105, and a plurality of trace lines 106. The transparent substrate 102, the sensing units 104, the border sensing units 105 and the trace lines 106 are disposed in an active region R1 of the self-capacitive touch device 100 and/or a border region R2 surrounding the active region R1. A planar contour of the active region R1 may include at least an arched side such that the active region R1 has a circular or ellipsoidal planar contour. It should be noted that, throughout the disclosure, the term "active region" refers to a region operable for touch control by a user, and the term "border region" refers to a region primarily for disposing peripheral circuits and/or trace lines.

Preferably, the sensing units 104 are equidistantly discretely disposed on the transparent substrate 102 and are in a design layout of an alternate arrangement or a most densely stacked arrangement, such that the plurality of sensing units 104 having substantially the same planar contour are disposed together to achieve maximum space utilization efficiency. Each of the sensing units 104 may be disposed along sides 1041, 1042, 1043, 1044, 1045 and 1046 of the adjacent sensing units 104, and has a side that is substantially parallel to one of the sides of the adjacent sensing unit 104. According to the embodiment, a large part of the sensing units 104 are disposed in the active region R1, and a small part of the sensing units 104 are disposed in the active region R1 and in the border region R2. The border sensing units 105 may also be disposed along the sides of the adjacent sensing units 104 and/or border sensing units 105. A side of each of the border sensing units 105 is substantially parallel and corresponding to one of the sides of the adjacent sensing units 104 and/or border sensing units 105. According to the embodiment, the border sensing units 105 are disposed along a periphery of the active region R1, or further cross an intersection of the active region R1 and the border region R2.

More specifically, the planar contour of the sensing units 104 may be a regular polygon having M sides, and the planar contour of the border sensing units 105 is an equally proportioned regular polygon obtained from dividing the regular polygon by N. Wherein, M is a positive integer equal to or greater than 4 and is preferably 6; N is a positive integer equal to or greater than 2 and is preferably 2. Further, as shown in FIG. 1, the sensing units 104 having a regular polygonal planar contour are primarily disposed in the active region R1, and the border sensing units 105 having an equally proportioned regular polygonal planar contour are disposed along an intersection R3 between the active region R1 and the border region R2.

Further, the sensing units 104 may be respectively correspondingly connected to the trace lines 106 on a one-on-one basis, so as to allow electric signals to be transmitted between an external circuit and the sensing units 104 via the trace lines 106. More specifically, the trace lines 106 are disposed between two adjacent sensing units 104, in a way that a large part of the trace lines 106 are disposed in the active region R1. Further, each of the trace lines 106 may include an internal connecting portion 1061 and an external connecting portion 1062. The internal connecting portions 1061 may directly come into contact with the corresponding sensing units 104, respectively, or preferably come into contact with vertices of the corresponding sensing units 104. The external connecting portions 108 may extend into the border region R2 to electrically connect to contact pads 108 in the border region R2. The contact pads 108 may serve as welding points for connecting to an external circuit or a control chip to transmit electrical signals to the external circuit for appropriate calculations.

More specifically, the transparent substrate 102 may include a rigid substrate such as glass, or a flexible substrate such as polycarbonate (PC), polyethylene terephthalate (PET), polymethylmesacrylate (PMMA), polysulfone (PES) or other cyclic olefin copolymers, for example. The sensing units 104 and the trace lines 106 may be a single-layer transparent conductive layer, and is preferably a transparent conductive material selected from a group consisted of indium tin oxide (ITO), indium zinc oxide (IZO), cadmium tin oxide (CTO), aluminum zinc oxide (AZO), indium tin zinc oxide (ITZO), zinc oxide, cadmium oxide, hafnium oxide (HfO), indium gallium zinc oxide (InGaZnO), indium gallium zinc magnesium oxide (InGaZnMgO), indium gallium magnesium oxide (InGaMgO) and indium gallium aluminum oxide (InGaAlO), for example. When transparency requirement is not needed, the external connecting portions 1062 of the trace lines 106 and the contact pads 108 in the border region R2 may be selected from a metal or alloy such as copper or gold having a low resistance value, or be formed by the above transparent conductive materials. A part of the external connecting portions 1062 may also be formed by a transparent conductive material, while the remaining part may be formed by a metal or alloy.

According to the above embodiment, the sensing units 104 having a regular polygonal planar contour are primarily disposed in the active region R1, and the border sensing units 105 having an equally proportioned regular polygonal planar contour are disposed along the intersection R3 between the active region R1 and the border region R2. Therefore, for the active region R1 having at least one arched side, the number of sensing units 104 disposed in the active region R1 having an arched planar contour can be maximized to achieve an optimal touch sensing capability.

In addition to the above self-capacitive touch device, a calculation method for a self-capacitive touch device is further provided according to another embodiment of the present invention. Details of the calculation method for a self-capacitive touch device are given below.

As shown in FIG. 2, when a user performs a touch operation on the self-capacitive touch device 100 using a finger or a stylus to apply at least one touch point 200 in an enlarged region R4, the touch point 200 may cover at least one sensing unit 104 such that the sensing units 104 covered by the touch point 200 generate a corresponding sensed capacitances. For example, for the self-capacitive touch device 100 of the embodiment, the touch point 200 may simultaneously cover parts of four sensing units 104. As the sensing units 104 are discretely disposed and the corresponding trace lines 106 are electrically connected to an external circuit, the sensing units 104 covered by the touch point 200 may independently output individual sensed capacitance values. The capacitance values are changed due to a size covered by the touch point 200, and a coordinate position of the touch point 200 may be subsequently determined through calculation according to the capacitance values outputted by the sensing units 104.

An example of the touch point 200 falling in an interval formed by the sensing unit 104 at the $(P-1)^{th}$ column and the $(Q+1)^{th}$ row to the sensing unit 104 at the $(P+3)^{th}$ column and the $(Q-1)^{th}$ row is given as follows. Wherein, P and Q are positive integers equal to or greater than 1. Further, one side 1045 of the sensing unit 104 at the $(P+2)^{th}$ column and the $Q^{th}$ row, one side 1044 of the sensing unit 104 at the $(P+1)^{th}$ column and the $(Q-1)^{th}$ row, and one side 1046 of the sensing unit 104 at the $(P+1)^{th}$ column and the $(Q-1)^{th}$ row are substantially parallel and corresponding to different sides 1042, 1041 and 1043 of the sensing unit 104 at the $P^{th}$ column and the $Q^{th}$ row, respectively.

For example, as shown in FIG. 2, when the touch point 200 simultaneously covers the sensing unit 104 at the $P^{th}$ column and the $Q^{th}$ row and the sensing units 104 at the $(P+2)^{th}$ column and the $Q^{th}$ row, equation (1) below may be applied to calculate and determine an X coordinate of the touch point 200:

$$X = \frac{C_1 \times X_0 + C_2 \times X_1}{\sum_{i=1}^{2} C_i} \qquad \text{equation (1)}$$

In the above equation, X represents the X coordinate that the self-capacitive touch device 100 determines according to the touch point 200, $C_1$ represents the sensed capacitance outputted by the sensing unit 104 at the $P^{th}$ column and the $Q^{th}$ row, $C_2$ represents the sensed capacitance outputted by the sensing unit 104 at the $(P+2)^{th}$ column and the $Q^{th}$ row, $X_0$ represents an X coordinate weight of the sensing units 104 at the $P^{th}$ column, and $X_1$ represents an X coordinate weight of the sensing units 104 at the $(P+2)^{th}$ column. The values of $X_0$ and $X_1$ may be determined according to the actual positions of the sensing units 104 and gradually increase or decrease from the left to right, and are preferably positive integers.

Similarly, when the touch point 200 simultaneously covers the sensing unit 104 at the $(P+1)^{th}$ column and the $(Q+1)^{th}$ row and the sensing unit 104 at the $(P+1)^{th}$ column and the $(Q-1)^{th}$ row, equation (2) below may be applied to calculate and determine the touch point 200:

$$Y = \frac{C_3 \times Y_0 + C_4 \times Y_1}{\sum_{i=1}^{2} C_i} \qquad \text{equation (2)}$$

In equation (2), Y represents a Y coordinate that the self-capacitive touch device 100 determines according to the touch point 200, C represents the sensed capacitance outputted by the sensing unit 104 at the $(P+1)^{th}$ column and the $(Q+1)^{th}$ row, $C_4$ represents the sensed capacitance outputted by the sensing unit 104 at the $(P+1)^{th}$ column and the $(Q-1)^{th}$ row, $Y_0$ represents a Y coordinate weight of the sensing units 104 at the $(Q+1)^{th}$ row, and represents a Y coordinate weight of the sensing units 104 at the $(Q-1)^{th}$ row. The values of $Y_0$ and $Y_1$ may be determined according to the actual positions of the sensing units 104 and gradually increase or decrease from the bottom to top, and are preferably positive integers.

To further increase the touch resolution of the self-capacitive touch device 100, the sensed capacitances sensed by four sensing units 104 may be simultaneously calculated to determine the X coordinate or the Y coordinate of the touch point 200. An example of a calculation method is given below.

For example, as shown in FIG. 2, when the touch point 200 simultaneously covers the sensing unit 104 at the $P^{th}$ column and the $Q^{th}$ row, the sensing unit 104 at the $(P+2)^{th}$ column and the $Q^{th}$ row, the sensing unit at the $(P+1)^{th}$ column and the $(Q+1)^{th}$ row, and the sensing unit 104 at the $(P+1)^{th}$ column and the $(Q-1)^{th}$ row, equation (3) below may be applied to calculate and determine the X coordinate of the touch point 200:

$$X = \frac{C_1 \times X_0 + (C_3 + C_4) \times X_2 + C_2 \times X_1}{\sum_{i=1}^{4} C_i} \qquad \text{equation (3)}$$

In equation (3), X represents the X coordinate that the self-capacitive touch device 100 determines according to the touch point 200, $C_1$ represents the sensed capacitance outputted by the sensing unit 104 at the $P^{th}$ column and the $Q^{th}$ row, $C_2$ represents the sensed capacitance outputted by the sensing unit 104 at the $(P+2)^{th}$ column and the $Q^{th}$ row, $C_3$ represents the sensed capacitance outputted by the sensing unit 104 at the $(P+1)^{th}$ column and $(Q+1)^{th}$ row, $C_4$ represents the sensed capacitance outputted by the sensing unit 104 at the $(P+1)^{th}$ column and $(Q-1)^{th}$ row, $X_0$ represents an X coordinate weight of the sensing units 104 at the $P^{th}$ column, $X_1$ represents an X coordinate weight of the sensing units 104 at the $(P+2)^{th}$ column, and $X_2$ represents an X coordinate weight of the sensing units 104 at the $(P+1)^{th}$ column. The values of $X_0$, $X_1$ and $X_2$ may be determined according to the actual positions of the sensing units 104 and gradually increase or decrease from the left to right, and are preferably positive integers.

Similarly, when the touch point 200 simultaneously covers the sensing unit 104 at the $P^{th}$ column and the $Q^{th}$ row, the sensing unit 104 at the $(P+2)^{th}$ column and the $Q^{th}$ row, the sensing unit 104 at the $(P+1)^{th}$ column and the $(Q+1)^{th}$ row, and the sensing unit 104 at the $(P+1)^{th}$ column and the $(Q-1)^{th}$ row, equation (4) below may be applied to calculate and determine the touch point 200:

$$Y = \frac{C_3 \times Y_0 + (C_1 + C_2) \times Y_2 + C_4 \times Y_1}{\sum_{i=1}^{4} C_i} \qquad \text{equation (4)}$$

In equation (4), Y represents a Y coordinate that the self-capacitive touch device 100 determines according to the touch point 200, $C_1$ represents the sensed capacitance outputted by the sensing unit 104 at the $P^{th}$ column and the $Q^{th}$ row, $C_2$ represents the sensed capacitance outputted by the sensing unit 104 at the $(P+2)^{th}$ column and the $Q^{th}$ row, $C_3$ represents the sensed capacitance outputted by the sensing unit 104 at the $(P+1)^{th}$ column and the $(Q+1)^{th}$ row, $C_4$ represents the sensed capacitance outputted by the sensing unit 104 at the $(P+1)^{th}$ column and the $(Q-1)^{th}$ row, $Y_0$ represents a Y coordinate weight of the sensing units 104 at the $(Q+1)^{th}$ row, represents a Y coordinate weight of the sensing units 104 at the $(Q-1)^{th}$ row, and $Y_2$ represents a Y coordinate weight of the sensing units 104 at the $Q^{th}$ row. The values of $Y_0$, $Y_1$ and $Y_2$ may be determined according to the actual positions of the sensing units 104 and gradually increase or decrease from the bottom to top, and are preferably positive integers.

The self-capacitive touch device and the calculation method thereof of the present invention are disclosed in the above embodiments. By adopting such planar contour and design layout of the sensing units 104 and the corresponding calculation method, the self-capacitive touch device 100 is allowed to achieve an optimal touch sensing capability.

The above self-capacitive touch device is described as an independent unit. However, the self-capacitive touch device may also be integrated with a display device or other appropriate devices to form a touch display device. Preferably, the touch display device is a wearable touch display device, which may be worn at a head, torso or limbs of a human body or an animal, for example. For example, the above display device may be a liquid crystal display (LCD) panel, an organic light emitting diode (OLED) display panel, an electro-wetting display panel, an e-ink display panel, a plasma display panel, a field emission display (FED) panel or other appropriate display devices.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A self-capacitive touch device, having an active region with at least an arched edge, comprising:
   a transparent substrate;
   a plurality of sensing electrodes, disposed on the transparent substrate in a most densely stacked arrangement and leaving minimum space without coverage at the arched edge of the active region, each of the sensing electrodes has one side substantially parallel and adjacent to one side of an adjacent sensing electrode of the sensing electrodes, each sensing electrode having a convex polygon shape with more than four sides, wherein at least two sides of each of the sensing electrodes align with sides of at least two of the remaining sensing electrodes; and
   a plurality of trace lines, respectively electrically connected to the sensing electrodes, a part of segments of the trace lines being disposed in the active region,
   wherein the trace lines are entirely disposed between the sensing electrodes, and each sensing electrode is coupled to only one trace line,
   wherein each of the internal connecting portions is connected to a vertex of one of the sensing electrodes,
   wherein each of the trace lines is connected to a corresponding contact pad, and the corresponding contact pad of each of the trace lines is located in a contact pad region disposed at a single side of the sensing electrodes,
   wherein the trace lines comprise a plurality of bend points, and number of the bend points of each of the trace lines increases with distance between the each of the trace lines and corresponding contact pad, wherein at least one part of the bend points of the part of segments of the trace lines being disposed in the active region have same bending angle, and the bending angle is 120 degrees.

2. The self-capacitive touch device according to claim 1, wherein the active region comprises at least one arched side.

3. The self-capacitive touch device according to claim 1, wherein the active region has a circular or ellipsoidal planar contour.

4. The self-capacitive touch device according to claim 1, further comprising:
a border region, surrounding the active region;
a plurality of border sensing electrodes, disposed along an intersection of the active region and the border region;
wherein, each of the border sensing electrodes has an equally proportioned regular polygonal planar contour obtained from dividing the regular polygonal planar contour by N, where N is a positive integer equal to or greater than 2.

5. The self-capacitive touch device according to claim 4, wherein a side of each of the border sensing electrodes is substantially parallel and adjacent to a side of an adjacent sensing electrode of the sensing electrodes.

6. The self-capacitive touch device according to claim 1, wherein the sensing electrodes have a same size and are equidistantly discretely disposed.

7. The self-capacitive touch device according to claim 1, further comprising a border region surrounding the active region; wherein each of the trace lines comprises an internal connecting portion and an external connecting portion, the internal connecting portions are disposed in the active region, and the external connecting portions are disposed in the border region and are formed by a conductive material comprising at least one of metal, alloy and indium tin oxide (ITO).

8. The self-capacitive touch device according to claim 1, wherein the trace lines and the sensing electrodes are a single-layer transparent conductive layer, and are formed by a transparent conductive layer.

9. A self-capacitive touch device, comprising:
an active area of a single transparent conducting layer with at least an arched edge, comprising:
a plurality of sensing electrodes in a most densely stacked arrangement and leaving minimum space without coverage at the arched edge of the active area, each of the sensing electrodes has one side substantially parallel and adjacent to one side of an adjacent sensing electrode of the sensing electrodes, each sensing electrode having a first convex polygon shape with ii ore than four sides, wherein at east two sides of each of the sensing electrodes align with sides of at least two other sensing electrodes; and
a plurality of trace lines, entirely disposed between said sensing electrodes, each of said trace lines directly connected at a first end to only one of said sensing electrodes,
wherein each of the internal connecting portions is connected to a vertex of one of the sensing electrodes,
wherein each of the trace lines is connected to a corresponding contact pad, and the corresponding contact pad of each of the trace lines is located in a contact pad region disposed at a single side of the sensing electrodes,
wherein the trace lines comprise a plurality of bend points, and number of the bend points of each of the trace lines increases with distance between the each of the trace lines and corresponding contact pad, wherein at least one part of the bend points of the part of segments of the trace lines being disposed in the active region have same bending angle, and the bending angle is 120 degrees.

10. The self-capacitive touch device according to claim 9, wherein each of the trace lines connects to a vertex of its corresponding sensing electrode.

11. The self-capacitive touch device according to claim 9, wherein said single transparent conducting layer further comprises:
a border region; and
a plurality of border sensing units, each shaped as bisection of said first convex polygon shape, disposed on a border between the active area and the border region.

12. The self-capacitive touch device according to claim 11, wherein each of the trace lines connects to vertex of its corresponding sensing electrode.

13. The self-capacitive touch device according to claim 11, wherein said active area is circular or ellipsoid.

14. The self-capacitive touch device according to claim 13, wherein each of the trace lines connects to a vertex of its corresponding sensing electrode.

15. The self-capacitive touch device according to claim 9, wherein each of said trace lines is directly connected at a second end opposite to said first end to a corresponding contact pad.

16. The self-capacitive touch device according to claim 15, wherein each contact pad corresponding to each of said trace lines is disposed within said contact pad region.

* * * * *